Aug. 27, 1935.    H. J. FINDLEY    2,012,745
AUTOMOBILE HEATER
Filed March 6, 1935

INVENTOR.
Howard J. Findley.
BY Slingh and Canfield
ATTORNEY.

Patented Aug. 27, 1935

2,012,745

UNITED STATES PATENT OFFICE 2,012,745

AUTOMOBILE HEATER

Howard J. Findley, Cleveland, Ohio, assignor to The Bishop & Babcock Mfg. Company, Cleveland, Ohio, a corporation of Ohio Application March 6, 1935, Serial No. 9,640

9 Claims. (Cl. 257—137)

This invention relates to air heaters and particularly to air heaters for heating the air in the interiors of automotive vehicles utilizing waste heat of the vehicle engine.

Heaters of this general class have been proposed comprising a so-called radiator having walled circulating passages therein through which liquid from the liquid circulating cooling system of the engine is circulated, and comprising air passages through which air is forced or blown by a motor-driven blower or fan in heat-absorbing contact with the walls of the liquid passageways, the air thus heated being blown into the vehicle interior.

Such heaters comprising a radiator, a fan or blower, and a motor for driving the latter, besides the water line connections through the radiator from the engine liquid circulating system, occupy a considerable volume of space and when installed in the usual passenger compartment of the usual automotive vehicle, take up so much room as to inconvenience the passengers.

It is therefore an object of this invention to provide generally an improved air heater of the class referred to.

Another object is to provide a heater of the class referred to which may be installed upon an automotive vehicle to supply heat to the passenger compartment thereof and which will occupy the minimum of space therein for a given heating capacity.

Another object is to provide a heater of the class referred to comprising a radiator, a blower, and a blower motor, disposed and arranged in an improved manner.

Another object is to provide a heater of the class referred to constructed to be mounted upon the so-called "dash" between the passenger compartment and the engine compartment of an automotive vehicle, and to dispose the heater in the passenger compartment and the motor in the engine compartment.

Another object is to provide an automotive vehicle heater construction of the class referred to adapted to be installed upon a vehicle which has been completed and put into use and permitting convenient mounting thereof on the dash of the vehicle, with the blower motor on the engine side and the radiator fan or blower on the passenger compartment side of the dash.

Another object is to provide, in a heater of the class referred to, improved means for supporting the fan or blower of the heater and the driving motor therefor.

Another object is to provide, in the liquid circulating radiator and air blower type of air heater, improved volumetric air flow efficiency.

Other objects will be apparent to those skilled in the art to which my invention appertains.

My invention is fully disclosed in the following description taken in connection with the accompanying drawing, in which.

Figures 1, 2:
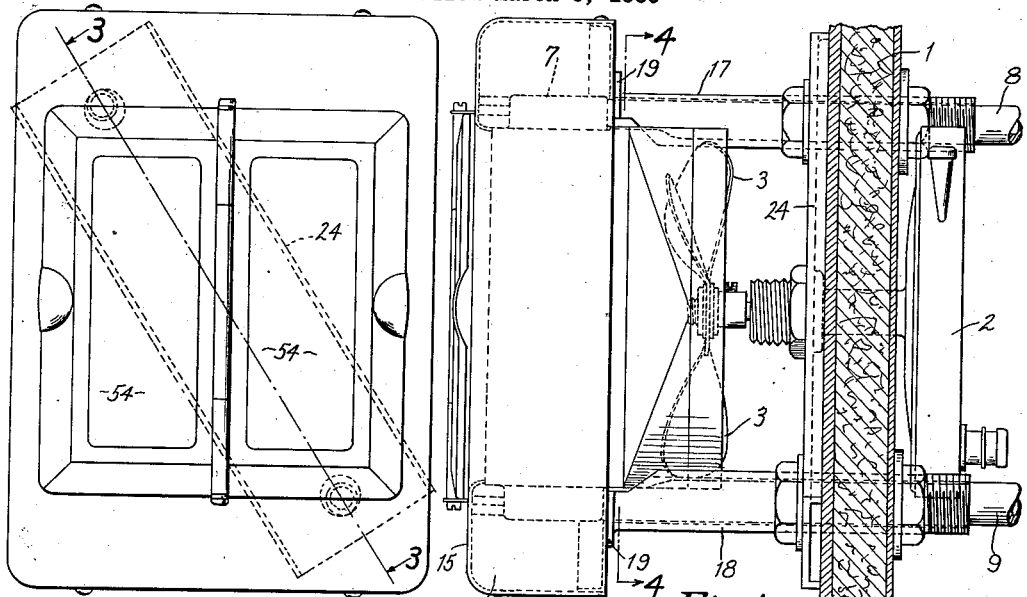
Fig. 1 is a side elevational view with parts broken away for clearness of an air heater embodying my invention and installed upon a fragmentarily illustrated portion of a vehicle dash.
Fig. 2 is a front elevational view of the heater of Fig. 1 taken from the left side as viewed in that figure.
Figure 4:
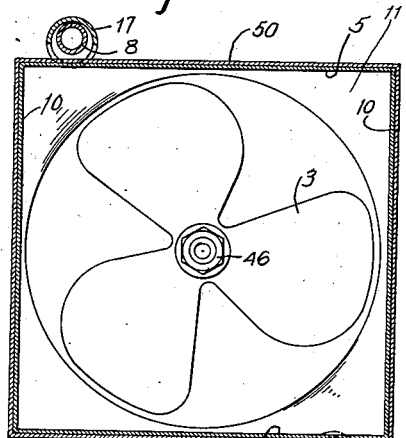
Fig. 4 is a cross-sectional view taken approximately from the plane 4—4 of Fig. 1 and drawn to a smaller scale.
Figure 5:
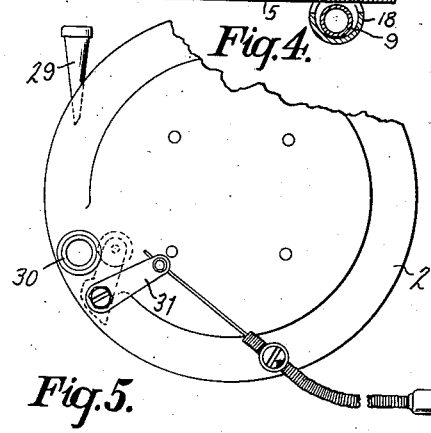
Fig. 5 is a view taken approximately from the plane 5—5 of Fig. 3.
Figure 3:
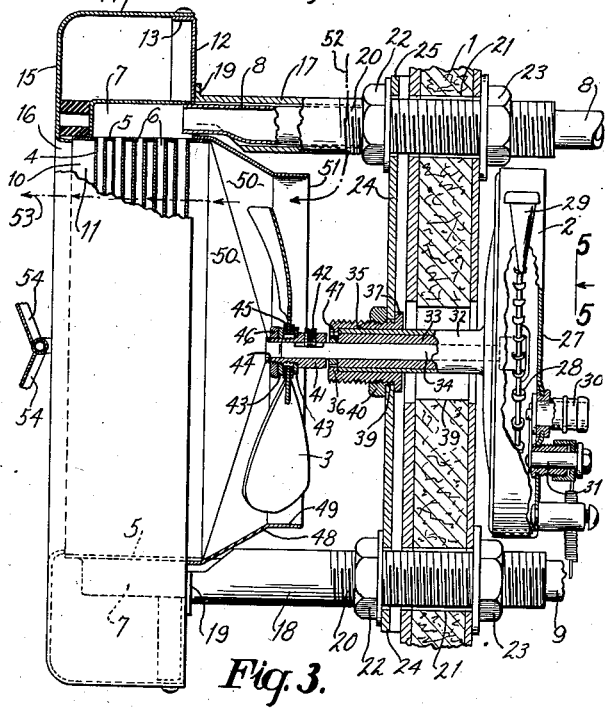
Fig. 3 is a sectional view taken approximately from the plane 3—3 of Fig. 2 with some of the parts in elevation.

Referring to the drawing, I have illustrated generally at 1 the dash of an automotive vehicle which is disposed between the passenger compartment and the engine compartment of the usual automotive vehicle; at 2 a motor in the engine compartment; and at 3 and 4, respectively, a blower and a radiator on the passenger compartment side of the dash 1.

The radiator, the exact construction of which constitutes no essential part of my invention, comprises, in the form illustrated, a pair of vertically spaced heads 5—5 of sheet metal to which are sealedly connected at opposite ends a plurality of tubes 6—6, the tubes opening at their ends into upper and lower header chambers 7—7 sealedly connected to the head elements 5—5.

Circulating pipes 8 and 9 project at their ends into the header chambers 7—7 with sealed connection with the walls of the chambers, and at the outer or right-hand ends as viewed in the drawing are broken away to simplify the drawing, and in the practice of my invention the pipes 8 and 9 are connected at suitable points to the liquid circulating cooling system of the vehicle engine.

By this construction when the engine is running and liquid is being circulated through its cooling system, the liquid is diverted from the cooling system into the pipe 8 and thence flows to the pipe 9 through the header chambers 7 and the tubes 6 heating the pipes. Inasmuch as the manner of connecting heater liquid supply pipes such as the pipes 8 and 9 to the circulating system of the vehicle engine is well known, it is believed unnecessary to illustrate or describe the same herein.

The head elements 5—5 of the radiator are joined by laterally spaced side walls 10, thus providing a rectangular passageway 11 in which the pipes 6 are disposed transversely, through which passageway air may be blown by the fan 3 in a manner to be described.

A hollow rectangular back plate 12 surrounds the radiator constructed as above described and is provided with a peripheral flange 13 upon which is telescopically mounted a peripheral wall 14 of a radiator cover having a front wall 15 provided with an opening 16 therein forming a continuation of the passageway 11.

The radiator thus constructed is supported by a pair of spaced sleeves 17 and 18 terminating in flanges 19—19 rigidly secured to the back plate 12 of the radiator; the sleeves 17 are externally threaded as at 20 and are projected through perforations or bores 21—21 in the dash 1 and rigidly mounted on the dash in the horizontally extending positions shown, by clamp nuts 22 and 23 on each side of the dash. In the preferred construction, a channel element 24 is provided extending across the face of the dash 1 having spaced perforations in the web thereof through which the sleeves 17 and 18 are projected, so that the channel 24 is also clamped upon the dash by the clamp nuts 22 and 23.

The pipes 8 and 9 extend axially through and are supported by the sleeves 17 and 18 and thus the pipes and the entire radiator construction are supported by the sleeves 17 and 18 upon the dash 1.

The motor 2 illustrated is a motor of the vacuum-operated type but this is not essential inasmuch as my invention may be practiced with other forms of motor such as electric, the vacuum type motor being illustrated to show that my invention may be embodied in an apparatus of minimum dimensions, not only in the passenger compartment, but in the engine compartment of the vehicle. The motor 2 comprises a housing 27 having therein an impeller type rotor 28 and having a jet nozzle 29 projecting into the housing and a nipple 30 communicating with the housing interior adapted to be connected, by a hose or other suitable conduit means, to a source of engine vacuum at the engine such as a point on the intake manifold. The housing 27 is otherwise hermetically sealed and when suction is applied at the nipple 30, a jet of atmospheric air will be forced through the nozzle 29 and direct a jet of air upon the blades of the impeller rotor 28 and rotate the same in a well known manner.

Means illustrated generally at 31 is provided to control the rate of withdrawal of air from the housing 27 through the nipple 30 to control the rate of rotation of the rotor 28. This means is more fully illustrated and described in my copending application Serial No. 713,543, filed March 1, 1934, for improvements in Heaters for automobiles (attorney's Docket No. 1705), and reference may be had thereto for a more complete description.

Integrally secured to the housing 27 and extending therefrom coaxially with the axis of rotation of the rotor 28, is a sleeve 32 in which is mounted a bearing bushing 33 and a shaft 34 connected to the rotor 28 is rotatably supported in the bearing bushing 33. The sleeve 32 is telescoped into a thimble 35 externally threaded and having outwardly a shoulder 36 upon which the sleeve 32 abuts and having inwardly a flange 37. Perforations 38 and 39 are provided in the dash 1 and in the abovementioned channel web 24, and the thimble 35 with the sleeve 32 and bearing 33 therein are projected through the perforations 38 and 39 with the flange 37 upon the inner side of the channel web 24 and a nut 40 on the threaded thimble is drawn up to clamp the channel web between the flange and the nut. By this construction, the sleeve 32 and therefore the motor housing 27 is rigidly supported on the channel 24.

The rotor shaft 34 extends outwardly from the end of the thimble 35 and the fan 3 is mounted thereon. The fan mounting preferably comprises a bushing 41 telescoped on the shaft, a set screw 42 securing the bushing to the shaft, washers 43—43 telescoped over a threaded portion 44 of the bushing 41 with a hub 45 of the fan 3 therebetween, and a nut 46 clamping the fan between the washers and rigidly securing it on the sleeve 41. A thrust washer 47 may be provided on the shaft 34 between the outer end of the bearing 33 and the inner end of the sleeve 41.

The fan 3 by the above described construction will be seen to be supported adjacent the dash 1 and to rotate in planes generally parallel thereto. The fan is circumferentially enclosed in a sheet metal funnel 48 comprising an annular portion 49 opening toward the dash 1 and coaxial with the fan. The annular portion 49 is joined to the above-described rectangular frame 5—5, 10—10, which provides the passageway 11, by flaring side wall portions 50—50, the rectangular passageway 11 preferably being larger than the diameter of the fan, to allow for space taken up by the tubes 6—6.

It will be observed that between the open end of the funnel 48 at 51 and the dash 1 there is a considerable space and air may move radially inwardly through this space in the direction indicated by the arrow 52 and be forced in the axial direction by the fan 3 forwardly through the funnel 48 and through the radiator and out as indicated by the arrow 53, and a continuous free flowing blast of air may thus be blown through the radiator by the fan 3, the air being heated by the hot water circulating through the radiator as above described.

By the construction above provided it will be observed that the motor 2 is entirely out of the passenger compartment, being on the engine side of the dash, and that the radiator and fan in the passenger compartment will occupy the minimum of space therein. By employing the channel 24 in the preferred construction, it is insured that the fan will be axially centered between the sleeves 17 and 18 and that the fan blades will be centered coaxially of the annular portion 49 of the air funnel. This is provided by centering the shaft of the fan and the sleeves 17 and 18 in predisposing perforations in the web 24 of the one-piece channel-form member. Furthermore, the motor and fan and radiator are all supported in predetermined cooperative positions by the channel and independently of the more or less irregularly formed and located perforations 21 and 38 which may be made through the dash at the time of installing the heater.

Furthermore, by supporting the motor on the said channel element independently of the dash, the motor, fan and cooperating shaft therebetween may be mounted in different cars having different thicknesses of dash without disarrangement of the parts and without detracting from the fitting and efficiency thereof. The construction provides that the motor, the fan, the fan funnel and the radiator are all supported and positioned on the channel element 24 and are supported on the dash 1 by supporting the channel thereon. To take up the minimum of space, the channel is preferably disposed at an inclination with the vertical as shown in Fig. 2. Furthermore, the entire heater may be assembled as a unit for transportation and to install the same the fan may be disconnected by means of the said screw 42 to permit withdrawal of the motor sleeve 32; and after the channel 24 is installed on the dash, the fan and motor may be reassembled therewith in their predetermined positions, thus rendering the assembling and installation of the device in a car quick, convenient and "fool-proof."

If desired, the front opening 16 of the radiator cover may be provided with doors 54—54 for conveniently changing the direction of egress of the heated air from the radiator in a well known manner.

While I have shown the element 24 as of channel form, it will be understood that this of course is not essential but is preferably employed as providing a maximum of strength with the minimum of material and as providing a recess between the flanges of the channel for the flange 37 of the thimble 35. It will be apparent, therefore, that other forms of element 24 may be used. Similarly, many other changes and modifications may be made in the above described embodiment of my invention without departing from the spirit thereof and without sacrificing its advantages and within the scope of the appended claims.

I claim:

1. A heater for automotive vehicles of the class comprising a vehicle compartment partition, a radiator and an air blower for blowing air therethrough supported at one side of the partition, and a motor for driving the blower supported at the other side of the partition having a blower driving shaft extending through the partition and a support on the partition having a rotary shaft bearing thereon.

2. A heater for automotive vehicles of the type comprising an engine compartment and a passenger compartment and a dash therebetween, the heater comprising a radiator and an air blower for blowing air therethrough disposed in the passenger compartment at one side of the dash, the heater having liquid conduits extending through the dash for connection with the liquid circulating system of the engine, and a motor for driving the blower disposed in the engine compartment at the other side of the dash and having a blower driving shaft extending through the dash and a support on the dash supporting the liquid conduit and a rotary bearing for the shaft.

3. A heater for automotive vehicles of the type comprising an engine compartment and a passenger compartment and a dash therebetween, the heater comprising a radiator and an air blower for blowing air therethrough disposed in the passenger compartment at one side of the dash, a motor for driving the blower disposed in the engine compartment at the other side of the dash and having a blower driving shaft extending through the dash, means to heat the radiator from waste heat of the vehicle engine and a support secured to the dash supporting the motor and a rotary shaft bearing.

4. A heater for automotive vehicles comprising a radiator disposed at one side of the vehicle dash and having liquid conduits extending through the dash for connection to the circulating system of the vehicle, a blower for blowing air through the radiator, and a motor for driving the blower, a drive shaft extending through the dash and connecting the blower and motor, and the blower being on the radiator side of the dash and the motor on the other side and a support on the dash supporting the motor and the liquid conduits.

5. In a heater construction for automotive vehicles of the type comprising a dash between passenger and engine compartments of the vehicle, a radiator in the passenger compartment, a motor in the engine compartment, a motor shaft extending through the dash, a blower for blowing air through the radiator disposed in the passenger compartment driven by the shaft and a support on the dash supporting the radiator, the motor and a shaft rotary bearing.

6. In a heater for automotive vehicles comprising a dash, a frame element secured to the dash having a bearing support thereon, a rotary shaft element rotatably supported in the bearing support, a motor rotor connected to the shaft on one side of the dash and an air blower connected to the shaft at the other side of the dash, a motor stator associated with the rotor and supported by the frame element, a hot-liquid-heated radiator disposed to have air blown therethrough by the blower, liquid circulating conduit means communicating with the radiator extending through the dash and adapted to be connected to the liquid cooling circulating system of the vehicle engine.

7. In a heater for the interiors of automotive vehicles comprising a dash, a radiator having a polygonal air flow walled passageway therethrough, and supported by the dash and spaced therefrom, a rotary bladed fan spaced from the radiator and between the radiator and the dash, an air funnel comprising an annular wall portion surrounding the fan blades and joined to and merging with the polygonal passageway opening by outwardly flaring wall portions, and a radial flow air passageway between the fan and the dash.

8. In a heater for the interiors of automotive vehicles comprising a dash, a radiator having a polygonal air flow walled passageway therethrough and supported by the dash and spaced therefrom, a rotary bladed fan spaced from the radiator and between the radiator and the dash, an air funnel comprising an annular wall portion surrounding the fan blades and joined to and merging with the polygonal passageway opening by outwardly flaring wall portions, a radial flow air passageway between the fan and the dash, and a fan driving motor on the other side of the dash.

9. In a heater for automotive vehicles of the class comprising an engine and a passenger compartment with a dash therebetween, a radiator in the passenger compartment having liquid circulating conduits extending through the dash for connection with the circulating system of the vehicle engine and supporting the radiator, a fan in the passenger compartment, a motor in the engine compartment driving the fan by a shaft extending through the dash, and a support on the dash supporting a rotary bearing for the shaft, the motor and the conduits.

HOWARD J. FINDLEY.